Sept. 4, 1934.     M. W. LINK     1,972,151
CONTROLLED FLOW PLUG VALVE
Filed Feb. 26, 1932
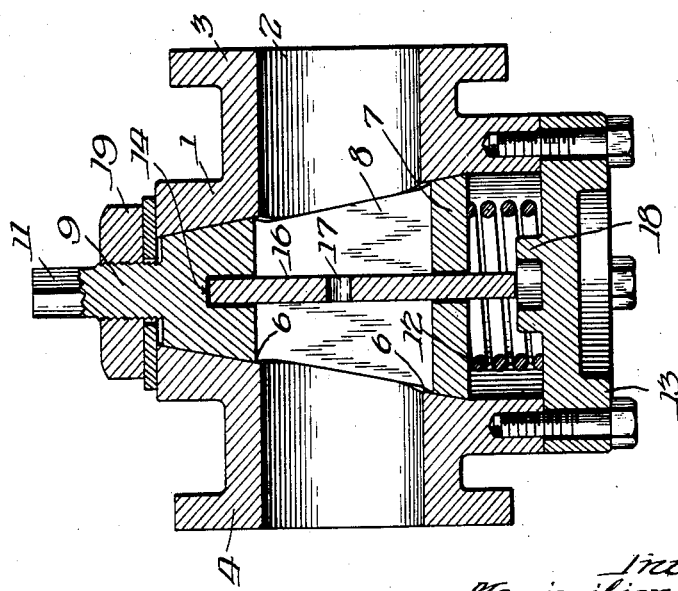

Patented Sept. 4, 1934

1,972,151

UNITED STATES PATENT OFFICE 1,972,151

CONTROLLED FLOW PLUG VALVE

Maximilian W. Link, Oak Park, Ill., assignor to Crane Co., Chicago, Ill., a corporation of Illinois Application February 26, 1932, Serial No. 595,241

1 Claim. (Cl. 251—91)

This invention relates to plug valves and more particularly to a valve of this type which has incorporated therein means for controlling the flow through the valve to a predetermined amount when the valve is in full open position.

There are many instances where it is desired or necessary to limit the flow through a shut-off valve to a predetermined amount when the valve is fully open. For instance, there are governmental restrictions as to the amount of oil which may be withdrawn from an oil well. In such service, therefore, it is necessary to control the flow of oil through the transport lines with the valves therein fully open.

Heretofore this has been accomplished by providing gate or globe valves with predetermined openings so that the flow through the valves could be controlled. In many instances, however, it is desirable to use a plug valve or cock rather than a gate or globe valve due to the fact that plug valves or cocks are particularly satisfactory for certain classes of work.

A plug valve of the type in which the plug is held to its seat by spring pressure is needed for many situations, and it is the object of the present invention to provide an improved plug valve of this type having means for the flow controlling function hereinbefore indicated.

The figure is a longitudinal vertical section through the center of a plug valve embodying the principles of this invention;

Referring to the drawing, the illustrated cock comprises in general a body 1 having a passage 2 therethrough and terminating in flanges 3 and 4 for connection to similar pipe ends. It is obvious that the body may terminate in any other type of connection if desired. The body is also provided with a tapered plug seat 6 arranged transversely to the passage 2. Seated within seat 6 of the body is a correspondingly tapered plug 7 having a port 8 therethrough which is parallel to passage 2 when the plug is in open position. The plug terminates in an upwardly extending stem 9 squared at its end as at 11 to provide means for engaging a wrench. The plug is urged into seating position by a spring 12 which is retained under compression by the cap 13 bolted to the body in the usual manner.

The plug is also provided with a recess 14 in the longitudinal center thereof extending practically the full length of the plug and transversely to port 8. Removably seated within this recess is a plate 16 having a central aperture 17 of predetermined cross-sectional area, generally less than the area of the ends of passage 2. The lower end of plate 16 engages a boss 18 of cap 13 which retains the plate in position.

It will be apparent that plate 16 may be removed at will and replaced by another plate having any suitable sized aperture therethrough. To facilitate the substitution of different plates, stem 9 is threaded to receive a nut 19 which may be screwed down into tight contact with the body to hold the plug locked in position while the plate is being changed.

The orificed plate 16 typifies any suitable removable member disposed longitudinally in the plug, withdrawable from the larger end thereof, and which provides across the port thereof an apertured wall appropriate for the purpose of the invention. The term "web member" is therefore adopted for said plate or any similar removable member which will provide such apertured wall across the port of the plug.

From the foregoing it will be observed that in accordance with the present invention the valve plug which is held to its seat by a spring is provided with a longitudinally disposed removable web member retained in the plug by the same means by which the spring for seating the turn plug is retained, said web member, which extends across the port of the plug, having an orifice of restricted cross section whereby the flow through the valve when fully open is controlled to a predetermined amount; while the nut engaging the plug stem holds the plug to its seat when the spring supporting cap is removed to permit removal of the web member and replacement by a similar member providing an orifice of different size or shape.

I claim:

A plug valve comprising a body having a passage therethrough and a tapered plug seat intersected by said passage, a correspondingly tapered plug fitted in said seat and having a transverse port for registration with said passage, a removable web member in the plug disposed longitudinally thereof and across said port, said web member having a transverse orifice of predetermined cross sectional area whereby the flow through the valve may be controlled to a predetermined amount when the plug is in fully open position, said plug being longitudinally recessed to receive said web member which is insertable from the larger end of the plug, a removable cap attached to the valve body closing the end thereof through which the plug is inserted, there being a chamber between said cap and the larger end of the plug, a coiled spring arranged in said chamber and reacting between said cap and the plug to force the latter to its seat, said web member projecting from the larger end of said plug and being retained in position therein by engagement with said cap, a threaded plug stem extending from the smaller end of said plug, and a nut engaging said stem and cooperable with the body to hold the plug seated when said cap is removed for interchanging the web member with another having an orifice of different size or shape.

MAXIMILIAN W. LINK.